US006999507B2

(12) United States Patent
Jin

(10) Patent No.: US 6,999,507 B2
(45) Date of Patent: Feb. 14, 2006

(54) DMT BIT ALLOCATION WITH IMPERFECT TEQ

(75) Inventor: Gary Qu Jin, Kanata (CA)

(73) Assignee: 1021 Technologies KK, Yokohama (JP)

( * ) Notice: Subject to any disclaimer, the term of this patent is extended or adjusted under 35 U.S.C. 154(b) by 747 days.

(21) Appl. No.: 09/739,979

(22) Filed: Dec. 20, 2000

(65) Prior Publication Data

US 2001/0005395 A1 Jun. 28, 2001

(30) Foreign Application Priority Data

Dec. 23, 1999 (GB) ................................. 9930399.2

(51) Int. Cl.
*H04B 17/00* (2006.01)
(52) U.S. Cl. ...................... 375/224; 375/357; 375/296; 375/222; 375/219; 370/252; 455/67
(58) Field of Classification Search ................ 375/224, 375/350, 260, 346, 232, 219, 222, 357, 296, 375/230; 370/252; 455/67
See application file for complete search history.

(56) References Cited

U.S. PATENT DOCUMENTS 5,606,577 A 2/1997 Grube et al. ................ 375/295

FOREIGN PATENT DOCUMENTS

| EP | 0 802 649 A1 | 10/1997 |
|----|--------------|---------|
| EP | 0 854 619 A1 | 7/1998 |
| EP | 0 918 422 A3 | 5/1999 |
| WO | 99/21333 | 4/1999 |

OTHER PUBLICATIONS

"Optimum finite-length equalization for multicarrier transceivers", Al-Dhahir et al., IEEE Transactions on Communications, vol. 44, No. 1, Jan. 1996, pp. 56-64.
"A bandwidth-optimized reduced-complexity equalized multicarrier transcevier", Al-Dhahir et al., IEEE Transactions Communications, vol. 45, No. 8, Aug. 1997, pp. 948-956.
"Fixed point algorithm for bit rate optimal equalatization in multicarrier systems", IEEE International Conference on Acoustics, Speech, and Signal Processing, vol. 5, Mar. 1999, pp. 2515-2518.
"Network and customer installation interfaces-asymmetric digital subscriber line (ADSL) metallic interface", ANSL.
"Sub-band adaptive pre-equalised OFDM transmission", IEEE Vehicular Technology Conference, Sep. 1999, pp. 334-338.

*Primary Examiner*—Shuwang Liu
*Assistant Examiner*—Eva Zheng

(57) ABSTRACT

A method of determining cross channel interference in an Discrete Multitone (DMT) implementation of a Digital Subscriber Line (DSL) system. The cross channel interference is determined utilizing a residual impulse spectrum after implementation of a Time Equalization (TEQ) algorithm. In one application the cross channel interference value is used in a bit allocation algorithm to improve such that more bits are allocated to the channels with low interference and fewer bits are allocated to those channels having high interference. In this application the bit allocation algorithm is run twice, once before the interference measurement and once after.

11 Claims, 2 Drawing Sheets

DMT BIT ALLOCATION WITH IMPERFECT TEQ

FIELD OF THE INVENTION

This invention relates to Digital Subscriber Line (DSL) transmission systems employing a Discrete Multitone (DMT) modulation scheme and, more particularly, to receivers and methods for use in such systems and schemes.

BACKGROUND

The expanding use of Internet services, electronic mail, file transfer and other home-office applications, continues to drive the need for higher bandwidth access to the home and small business operations. The Digital Subscriber Line (DSL) technology, including Asymmetrical Digital Subscriber Line (ADSL), has provided an effective mechanism to make use of existing copper access loops and to significantly increase transmission speeds while permitting parallel usage of telephone and Internet services.

The Discrete Multitone (DMT) modulation technique is a particularly suitable way of implementing DSL in order to provide high speed and efficient use of existing bandwidth. In DMT, multiple narrow bandwidth sub-carriers all transmit at once in parallel and each carry a small fraction of the total information. The sub-carriers or tones, each corresponding to a subchannel, have different center frequencies, are independently modulated wit data and are processed in parallel. For example, in DMT, the bandwidth may be divided between 256 sub-carriers, each with a 4 kHz bandwidth. Multi-carrier modulation requires orthogonality between all the sub-carriers and a Fast Fourier Transform (FFT) is a convenient method of achieving this modulation. At low frequencies, where copper wire attenuation is low and signal to noise ratio (SNR) is good, it is common to use a high bit rate, but at higher frequencies when unfavourable line conditions exist, modulation is reined to accommodate lower signal to noise ratio. Impulse noise which may be generated by electrical appliances, lightning or with a phone going off hook or ringing, is wideband in frequency and narrow in time so it is spread over many DMT subchannel and its influence over any subchannel is relatively small. Nonetheless, the line impulse response can result in symbol distortion at the receiver. In order to offset the line impulse response, it is known to insert a cyclic prefix (M) in the time domain samples. The cyclic prefix between symbols tends to reduce inter-symbol interference. Frequently, however, the line impulse response will last longer than the typical cyclic prefix time samples and, to address this, it is known to implement a time domain channel equalizer (TEQ) algorithm. The TEQ algorithm, which applies a Fast Fourier Transform, attempts to shorten the line impulse response into M time samples. However, the response can never be exactly the finite duration of the M samples regardless of the kind of TEQ algorithm implemented. As a result, there is always channel leakage outside the M samples which causes symbol distortion or inter-channel interference at the receiver. Although the interference level is mostly very small, the interference is not evenly distributed about the channels and some channels may experience much higher interference which will cause receiver data error.

SUMMARY OF THE INVENTION

The present invention provides a method of measuring the cross-channel interference in a DMT system in which line impulse influence exists after a TEQ algorithm.

The present invention also provides a simple, optimum implementation for bit allocation in a DMT scheme as used in a DSL application.

In embodiments of the present invention, the cross-channel interference with imperfect or inadequate TEQ is estimated and the transmitted data allocation is based on the interference levels. For example, more bits are provided to the channel with less interference, and fewer bits are provided to the channel with high interference. This controls the bit error rate to the desired level.

Therefore, in accordance with a first aspect of the present invention there is a provided a method of determining interference between channels in a digital subscriber line (DSL) transmission system employing discrete multitone (DMT) modulation comprising the steps of:

determining a power mask level per channel P(k);

obtaining a channel impulse response (h(n)) after implementation of a time equalization (TEQ) algorithm;

zeroing an integer number (M) of main coefficient values of the channel impulse response (h(n)) to produce a residual impulse response (h'(n));

obtaining from the residual impulse response (h'(n)) a corresponding residual impulse spectrum (H'(k)); and multiplying the per channel power mask level P(k) and residual impulse spectrum (H'(k)) to obtain a cross-channel interference level.

In accordance with a second aspect of the present invention there is provided a method of estimating cross-channel interference (I(k)) in a discrete multitone (DMT) communication system implemented in a digital subscriber line (DSL) application, the DMT system employing inter-symbol cyclic prefix (M) and time equalization (TEQ), the method comprising:

(a) measuring a total channel impulse response (h(n)) after TEQ;

(b) zeroing an integer number (M) of main coefficients from h(n) to produce a residual impulse response (h'(n));

(c) performing Fast Fourier transform (FFT) analysis on the residual impulse response (h'(n)) to provide a residual impulse spectrum (H'(k)); and (d) multiplying the residual impulse spectrum (H'(k)) with a measured maximum power per channel value to obtain cross channel interference level (I(k)).

In accordance with a further aspect of the present invention there is provided a method of allocating bits per channel in a DMT communication system implemented in a DSL application, the system employing inter-symbol cyclic prefix and time equalization, the method comprising:

performing a first bit allocation algorithm to obtain a first bit per channel value (b(k)) and a first transmission power level per channel ($P_x(k)$) from a measured noise level per channel (V(k)), a first power mask level per channel (P(k)), a measured channel impulse response (h(n)) and a signal-to-noise ratio requirement (SNR (bn)); obtaining a cross channel interference value (I(k)) based on said measured channel impulse response (h(n));

obtaining a modified noise value ($V_1(k)$) by adding the cross channel interference value (I(k)) to said measured noise value (V(k));

obtaining a second power mask level per channel ($P_1(k)$) based on said first transmission power per channel level $P_x(k)$); and implementing a second bit allocation algorithm utilizing said modified noise value ($V_1(k)$), said signal to noise ratio requirement (SNR(bn)) and said second power mask level per channel (P1(k)) to obtain a final bit per channel allocation ($b_1(k)$).

According to yet another aspect of the invention, there is provided a Digital Subscriber Line (DSL) transmission system employing Discrete Multitone (DMT) modulation, having means for determining interference between channels, comprising:
means to determine a power mask level per channel P(k);
means to obtain a channel impulse value h(n) after implementation of a time equalization (TEQ) algorithm;
means for zeroing an integer number (M) of main coefficient values of the channel impulse response to produce a residual impulse response (h'(n));
means for obtaining from the residual impulse response (h'(n)) a corresponding residual impulse spectrum (H'(k)); and
a multiplier to multiply the per channel power mask level and the residual impulse spectrum (H'(k)) to obtain a cross channel interference (I(k)) level.

According to still another aspect of the invention, there is provided a Discrete Multitone (DMT) communication system implemented in a Digital Subscriber Line (DSL) application, said DMT system employing inter-symbol cyclic prefix and Time Equalization (TEQ), and having cross-channel interference (I(k)) estimating means comprising:
a) measurement means to measure a total channel impulse response h(n) after TEQ;
b) means to zero an integer number (M) of main coefficient values from the channel impulse response h(n) to obtain a residual impulse response (h'(n));
c) means to perform Fast Fourier Transform (FFT) analysis on the residual impulse response (h'(n)) to obtain a corresponding residual impulse spectrum (H'(k)); and
d) means for multiplying the residual impulse spectrum (H'(k)) with a maximum power per channel value to obtain a cross channel interference level (I(k)).

According to yet another aspect of the invention, there is provided a DMT communication system implemented in a DSL application employing inter-symbol cyclic prefix and Time Equalization, said system having means for allocating bits per channel comprising;
means for performing a first bit allocation algorithm to obtain a first bit per channel value (b(k)) and a first transmission power level per channel ($P_x(k)$) from a measured noise level per channel (V(k)), a first power mask level per channel (P(k)), a measured channel impulse response (h(n)) and a signal-to-noise ratio requirement (SNR(bn));
means for obtaining a cross channel interference value (I(k)) based on said measured impulse response (h(n));
means for obtaining a modified noise value ($V_1(k)$) by adding the cross channel interference value (I(k)) to said measured noise value (V(k));
means for obtaining a second power mask level per channel ($P_1(k)$) based on said first transmission power per channel level $P_x(k)$); and
means for implementing a second bit allocation algorithm (24) utilizing said modified noise value ($V_1(k)$), said signal to noise ratio requirement (SNR(bn)) and said second power mask level per channel (P1(k)) to obtain a final bit per channel allocation ($b_1(k)$).

According to yet another aspect of the invention, there is provided a receiver for use in a Digital Subscriber Line (DSL) transmission system employing Discrete Multitone (DMT) modulation, the receiver having interference determining means comprising:
means to determine a power mask level per channel P(k);
means to obtain a channel impulse value h(n) after implementation of a time equalization (TEQ) algorithm;
means for zeroing an integer number (M) of main coefficient values of the channel impulse response to produce a residual impulse response (h'(n));
means for obtaining from the residual impulse response (h'(n)) a corresponding residual impulse spectrum (H'(k)); and
a multiplier to multiply the per channel power mask level and the residual impulse spectrum (H'(k)) to obtain a corresponding cross channel interference (I(k)) level.

According to yet another aspect of the invention, there is provided a receiver for use in a Discrete Multitone (DMT) communication system implemented in a Digital Subscriber Line (DSL) application, said DMT system employing inter-symbol cyclic prefix and Time Equalization (TEQ), the receiver having cross-channel interference (I(k)) estimating means comprising:
a) measurement means to measure a total channel impulse response h(n) after TEQ;
b) means to zero an integer number (M) of main coefficient values selected from the channel impulse response h(n) to produce a residual impulse response (h'(n));
c) means to perform Fast Fourier Transform (FFT) analysis on the residual impulse response (h'(n)) to obtain a corresponding residual impulse spectrum (H'(k)); and
d) means to obtain cross-channel interference (I(k)) by multiplying the residual impulse spectrum (H'(k)) with a maximum power per channel value.

According to yet another aspect of the invention, there is provided a receiver for use in a DMT communication scheme implemented in a DSL application employing inter-symbol cyclic prefix and Time Equalization, said receiver having means for allocating bits per channel comprising;
means for performing a first bit allocation algorithm to obtain a first bit per channel value (b(k)) and a first transmission power level per channel ($P_x(k)$) from a measured noise level per channel (V(k)), a first power mask level per channel (P(k)), a measured channel impulse response (h(n)) and a signal-to-noise ratio requirement (SNR(bn));
means for obtaining a cross channel interference value based on a measured impulse response;
means for obtaining a modified noise value by adding the cross channel interference value to a measured noise value;
means for obtaining a second power mask level per channel based on said first power level per channel; and
means for implementing a second bit allocation algorithm utilizing said modified noise value, a signal to noise ratio requirement and said second power mask level per channel to obtain a final bit per channel allocation.

BRIEF DESCRIPTION OF THE DRAWINGS

Preferred embodiments of the invention will now be described in greater detail and by way of example only, with reference to the attached drawings wherein.

DETAILED DESCRIPTION OF PREFERRED EMBODIMENTS OF THE INVENTION

Figure 1:
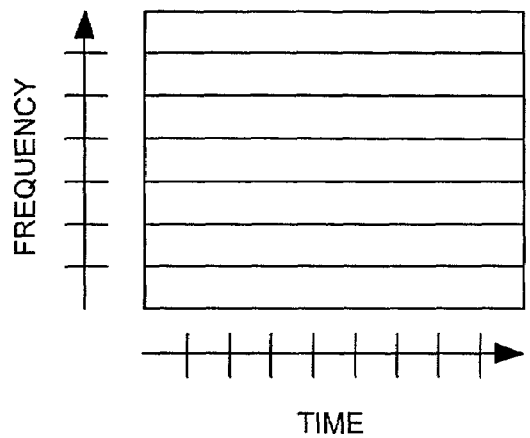
FIG. 1 shows the frequency and time relationship in a discrete multitone (DMT) implementation.

As discussed previously, DMT operates in the frequency domain. Each DMT subchannel (there are many being communicated in parallel) lasts a long time but operates in a narrow frequency band of the total bandwidth. As shown in FIG. 1, the total frequency band is divided into many narrow bands, each corresponding to a sub-carriers or sub-channel, and each sub-carrier is modulated with information in the time domain. Bits are allocated to each subchannel for transmission and, at the receiver, the bits in each subchannel are demodulated to retrieve the communicated information.

Figure 2:
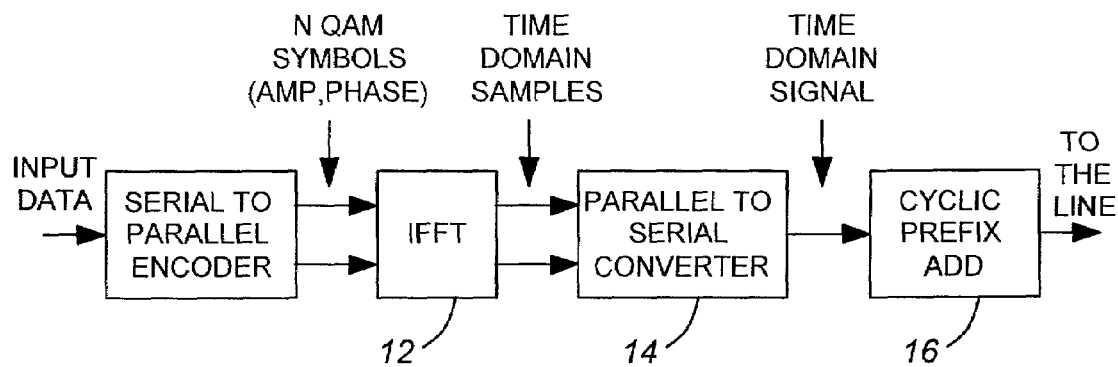
FIG. 2 is a block diagram of a basic DMT transmitter.

In the DMT based DSL system N point FFT is used to transform N frequency subchannel carriers having quadrature amplitude modulation (QAM) modulated thereon into N point time domain samples. Thus in the DMT transmitter shown in FIG. 2, input data is provided to a serial to parallel encoder. The output has N QAM symbols imparted thereto and, following the Inverse Fast Fourier Transform (IFFT) 12, the data is broken into time domain samples and, following the parallel to serial converter 14 the time domain signal may be passed through a digital to analogue converter (not shown) and onto the output line. Typically a cyclic prefix (M) is inserted into the time domain signal prior to transmission, as indicated by box 16.

Figure 3:
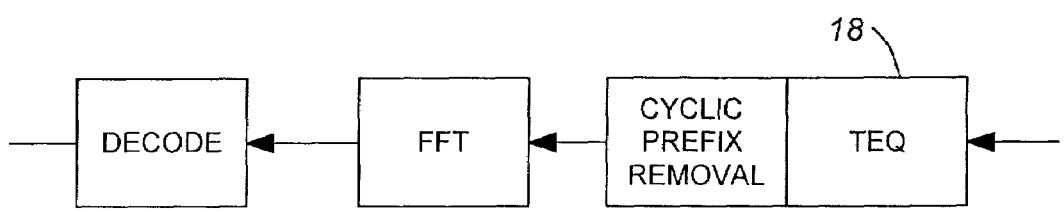
FIG. 3 is a basic block diagram of a DMT receiver.

Referring now to FIG. 3, in the DMT receiver, the received signal is passed trough an A to D converter (not shown). Typically, the cyclic prefix M has a smaller value than N for minimum redundancy. Because most line impulse responses last much longer than M time samples, a time domain channel equalizer (TEQ) 18 is required. There are several TEQ algorithms available that are used to shorten the channel into M time samples. However, the channel can never have an exactly finite duration with only M samples, no matter what kind of TEQ algorithm is applied. As a result, there is always channel leakage outside the M samples which will cause symbol distortion or inter-channel interference at the receiver. Although the interference level is usually very small, the interference is not evenly distributed between the channels, and some channels may experience much higher interference levels which, in turn, will cause receiver data error.

Figure 4:
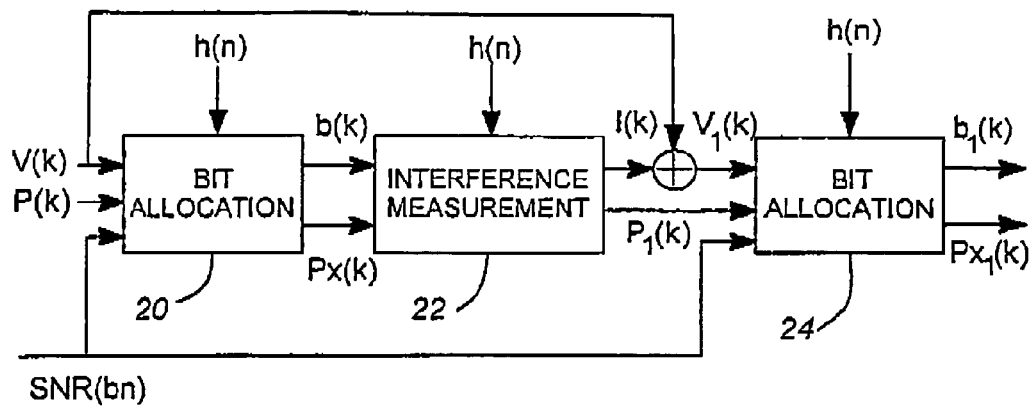
FIG. 4 shows at a high level the bit allocation process.

FIG. 4 shows schematically the bit allocation scheme, including cross-channel interference measurement according to the present invention. Typically, the bit allocation algorithms use the following information to decide how many bits should be transmitted on each channel: power mask or maximum transmission power at each channel; noise level including near end cross talk (NEXT) and far end cross talk (FEXT), the signal to noise ratio (SNR) requirements for bit transmission and the channel impulse response which gives channel attenuation for each channel. The output of the bit allocation algorithm provides: the number of bits to be transmitted per channel and the corresponding transmitting power for each channel.

In FIG. 4, the first bit allocation algorithm 20 takes inputs V(k) which is the measured noise power for each channel; P(k) which is the power mask level which limits transmission power for each channel; and SNR(bn) which is the signal to noise ratio requirement when bit bits are transmitted at the given channel. As shown in FIG. 4, the outputs of the first bit algorithm are b(k) which is the number of bits to be transmitted via channel k in accordance with the bit allocation algorithm 20 and Px(k) which is the transmission power for channel k.

The interference measurement block 22 of FIG. 4 measures the cross-channel interference level I(k) based on the total channel impulse response h(n) after the time equalization (TEQ) algorithm and the transmission power level Px(k) from the first bit allocation algorithm. The interference I(k) which is the statistically combined interference to channel k from all other channels is added to the measured noise level V(k) and the result $V_1(k)$ becomes the modified noise power level which is provided to the second bit allocation algorithm 24. The interference measurement algorithm, vis. block 22, also outputs the new power mask level $P_1(k)$ to the second bit allocation algorithm 24. The reason for a new power mask level is that the cross-channel interference I(k) is signal dependent. Since the total noise level increases with cross-channel interference noise being added, the signal transmitting power will be increased as well. Consequently, the cross-channel interference I(k) will be increased which otherwise would result in a repeating loop. The interference measurement algorithm, block 22, calculates the new power mask level $P_1(k)$ based on the pre-calculated transmission power level Px(k) and the maximum power transmitted will be fixed at $P_1(k)$. The calculated interference is based on the maximum possible transmission power $P_1(k)$. Using the new power mask level $P_1(k)$, the signal-to-noise ratio requirement SNR(bn) and the modified noise power $V_1(k)$, the second bit allocation algorithm 24 obtains the final bit allocation $b_1(k)$ and its corresponding transmitting power $Px_1(k)$ which takes into account the aforementioned cross-channel interference.

One way to determine the new power mask function is described as follows:

Let $P_{max}=\max(Px(k))$, then we have $$P_1(k) = \begin{cases} P_{max}, & P(k) \geq P_{max} \\ P(k), & P(k) < P_{max} \end{cases}$$

Figure 5:
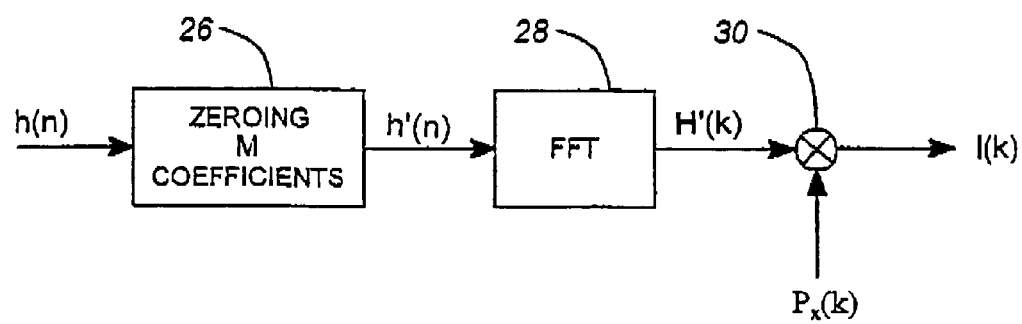
FIG. 5 illustrates at a high level the interference measurement process.

The above equation means that $P_{max}$ is chosen as the new maximum transmission power for all channels unless it is above the original mask power, in which case the original mask power P(K) is retained. In theory, with the newly calculated mask power, it is possible to calculate statistical interference levels in all channels. However, the precise calculation is still a very complicated procedure that involves the computation of each channel interference from all other channels. FIG. 5 shows a simple approximate upbound or upper limit for the cross-channel interference with given total channel impulse response h(n) after TEQ.

As mentioned before, with an M point cyclic prefix being added in the transmitted signal, there will be no interference if the total channel response h(n) is of finite length lasting only M sample points. The block "zeroing M coefficients" identified by reference numeral 26 in FIG. 5 sets those M coefficients to zeros and the remaining coefficients in the resulting residual impulse response h'(n) then represent the inter-channel interference. FFT unit 28 takes, the Fourier transform of the residual channel impulse response h'(n) to obtain a residual impulse spectrum H'(k) and multiplier 30 multiplies the resulting residual impulse spectrum H'(k) with $P_1(k)$ to give out the upbound for the cross-channel interference I(k).

To get the interference level, it is possible to use either I(k) or the envelope of I(k), or some other modified form of I(k). $P_1(k)$ can also be modified based on Px(k) and P(k). In the $P_1(k)$ calculation, Pmax can be replaced with a local maximum of Px(k), such that $P_{max}(k)=\max_{k1}(Px(k+k1))$, for $-C<k1<C$ where C is predetermined value to decide the neighboring area around K. If $P_1(k)$ is chosen such that $P_1(k)$ =min([SNR(max(bn))][(max(V(k))], max(P(k))), the first bit allocation in FIG. 4 becomes unnecessary. In this way, one half the computation for bit allocation is saved by running it only once and $P_1(k)$ becomes a constant which is the maximum potential transmitted power at each channel.

Although a preferred embodiment of the invention has been disclosed and illustrated, it will be apparent to one skilled in the art that numerous alternatives can be made to the invention without departing from the basic concept. It is to be understood, however that such changes will fall within the true scope of the invention as defined by the appended claims.

The invention claimed is:

1. A method of determining interference between channels in a Digital Subscriber Line (DSL) transmission system employing Discrete Multitone (DMT) modulation comprising:
   determining a power mask level per channel P(k);
   obtaining a channel impulse response (h(n)) after implementation of a time equalization (TEQ) algorithm;
   zeroing an integer number (M) of main coefficient values of the channel impulse response to produce a residual impulse response (h'(n));
   obtaining from the residual impulse response (h'(n) a corresponding residual impulse spectrum (H'(k));
   and multiplying the per channel power mask level and the residual impulse spectrum (H'(k)) to obtain a cross channel interference (I(k)) level.

2. The method according to claim 1 wherein a Fast Fourier Transform (FFT) is employed to obtain said residual impulse spectrum (H'(k)).

3. A method of estimating cross channel interference I(k) in a Discrete Multitone (DMT) communication system implemented in a Digital Subscriber Line (DSL) application, said DMT communication system employing inter-symbol cyclic prefix and Time Equalization (TEQ), the method comprising:
   a) measuring a total channel impulse response h(n) after TEQ;
   b) zeroing an integer number (M) of main coefficient values of the channel impulse response h(n) to produce a residual impulse response (h'(n));
   c) performing Fast Fourier Transform (FFT) analysis on the residual impulse response (h'(n)) to obtain a corresponding residual impulse spectrum (H'(k)); and
   d) multiplying the residual impulse spectrum (H'(k)) with a maximum power per channel value to obtain cross channel interference level (I(k).

4. A method of allocating bits per channel in a DMT communication system implemented in a DSL application, said system employing inter-symbol cyclic prefix and Time Equalization, said method comprising;
   performing a first bit allocation algorithm to obtain a first bit per channel value (b(k)) and a first transmission power level per channel ($P_x(k)$) from a measured noise level per channel (V(k)), a first power mask level per channel (P(k)), a measured channel impulse response (h(n)) and a signal-to-noise ratio requirement (SNR (bn));
   obtaining a cross channel interference value (I(k)) based on said measured channel impulse response (h(n));
   obtaining a modified noise value ($V_1(k)$) by adding the cross channel interference value (I(k)) to said measured noise value (V(k));
   obtaining a second power mask level per channel ($P_1(k)$) based on said first transmission power per channel level $P_x(k)$); and
   implementing a second bit allocation algorithm utilizing said modified noise value ($V_1(k)$), said signal to noise ratio requirement (SNR(bn)) and said second power mask level per channel ($P_1(k)$) to obtain a final bit per channel allocation ($b_1(k)$).

5. The method according to claim 4, wherein a second power mask per channel level is derived by said second bit allocation algorithm.

6. A Digital Subscriber Line (DSL) transmission system employing Discrete Multitone (DMT) modulation, having means for determining interference between channels, comprising:
   means to determine a power mask level per channel P(k);
   means to obtain a channel impulse value h(n) after implementation of a time equalization (TEQ) algorithm;
   means for zeroing an intoner number (M) of main coefficient values of the channel impulse response to produce a residual impulse response (h'(n));
   means for obtaining from the residual impulse response (h'(n)) a corresponding residual impulse spectrum (H' (k); and
   a multiplier to multiply the per channel power mask level and the residual impulse spectrum (H'(k)) to obtain a cross channel interference (I(k)) level.

7. A Discrete Multitone (DMT) communication system implemented in a Digital Subscriber Line (DSL) application, said DMT system employing inter-symbol cyclic prefix and Time Equalization (TEQ), and having cross-channel interference (I(k)) estimating means comprising:
   a) measurement means to measure a total channel impulse response h(n) after TEQ;
   b) means to zero an integer number (M) of main coefficient values from the channel impulse response h(n) to obtain a residual impulse response (h'(n));
   c) means to perform Fast Fourier Transform (FFT) analysis on the residual impulse response (h'(n) to obtain a corresponding residual impulse spectrum (H'(k)); and
   d) means for multiplying the the residual impulse spectrum (H'(k)) with a maximum power per channel value to obtain a cross channel interference level (I(k)).

8. A DMT communication system implemented in a DSL application employing inter-symbol cyclic prefix and Time Equalization, said system having means for allocating bits per channel comprising:
   means for performing a first bit allocation algorithm to obtain a first bit per channel value (b(k)) and a first transmission power level per channel ($P_x(k)$) from a measured noise level per channel (V(k)), a first power mask level per channel (P(k)), a measured channel impulse response (h(n)) and a signal-to-noise ratio requirement (SNR(bn));
   means for obtaining a cross channel interference value (I(k)) based on said measured impulse response (h(n));

means for obtaining a modified noise value ($V_1(k)$) by adding the cross channel interference value ($I(k)$) to said measured noise value ($V(k)$);

means for obtaining a second power mask level per channel ($P_1(k)$) based on said first transmission power per channel level $P_x(k)$); and means for implementing a second bit allocation algorithm (24) utilizing said modified noise value ($V_1(k)$), said signal to noise ratio requirement (SNR(bn)) and said second power mask level per channel ($P_1(k)$) to obtain a final bit per channel allocation ($b_1(k)$).

9. A receiver for use in a Digital Subscriber Line (DSL) transmission system employing Discrete Multitone (DMT) modulation, the receiver having interference determining means comprising:

means to determine a power mask level per channel P(k);

means to obtain a channel impulse value h(n) after implementation of a time equalization (TEQ) algorithm;

means for zeroing an integer number (M) of main coefficient values of the channel impulse response to produce a residual impulse response (h'(n));

means for obtaining from the residual impulse response (h'(n)) a corresponding residual impulse spectrum (H'(k)); and a multiplier to multiply the per channel power mask level and the residual impulse spectrum (H'(k)) to obtain a corresponding cross channel interference (I(k)) level.

10. A receiver for use in a Discrete Multitone (DMT) communication system implemented in a Digital Subscriber Line (DSL) application, said DMT system employing inter-symbol cyclic prefix and Time Equalization (TEQ), the receiver having cross-channel interference (I(k)) estimating means comprising:

a) measurement means to measure a total channel impulse response h(n) alter TEQ;

b) means to zero an integer number (M) of main coefficient values selected from the channel impulse response h(n) to produce a residual impulse response (h'(n));

c) means to perform Fast Fourier Transform (FFT) analysis on the residual impulse response (h'(n)) to obtain a corresponding residual impulse spectrum (H'(k)); and d) means to obtain cross-channel interference (I(k)) by multiplying the residual impulse spectrum (H'(k)) with a maximum power per channel value.

11. A receiver for use in a DMT communication scheme implemented in a DSL application employing inter-symbol cyclic prefix and Time Equalization, said receiver having means for allocating bits per channel comprising;

means for performing a first bit allocation algorithm to obtain a first bit per channel value (b(k)) and a first transmission power level per channel ($P_x(k)$) from a measured noise level per channel (V(k)), a first power mask level per channel (P(k)), a measured channel impulse response (h(n)) and a signal-to-noise ratio requirement (SNR(bn));

means for obtaining a cross channel interference value based on a measured impulse response;

means for obtaining a modified noise value by adding the cross channel interference value to a measured noise value;

means for obtaining a second power mask level per channel based on said first power level per channel; and means for implementing a second bit allocation algorithm utilizing said modified noise value, a signal to noise ratio requirement and said second power mask level per channel to obtain a final bit per channel allocation.

* * * * *